United States Patent
Janardhanan et al.

(10) Patent No.: US 11,315,693 B2
(45) Date of Patent: Apr. 26, 2022

(54) METHOD AND SYSTEM FOR MANAGING OPERATION ASSOCIATED WITH AN OBJECT ON IOT ENABLED DEVICES

(71) Applicant: SIEMENS AKTIENGESELLSCHAFT, Munich (DE)

(72) Inventors: Shaiju Janardhanan, Kannur (IN); Sandeep Krishnan, Bangalore (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/272,279

(22) PCT Filed: Aug. 30, 2019

(86) PCT No.: PCT/EP2019/073254
§ 371 (c)(1),
(2) Date: Feb. 26, 2021

(87) PCT Pub. No.: WO2020/043897
PCT Pub. Date: Mar. 5, 2020

(65) Prior Publication Data
US 2021/0183529 A1      Jun. 17, 2021

(30) Foreign Application Priority Data
Aug. 31, 2018 (EP) .................................... 18191989

(51) Int. Cl.
*G06F 15/16* (2006.01)
*G16Y 40/10* (2020.01)
(Continued)

(52) U.S. Cl.
CPC ................ *G16Y 40/10* (2020.01); *G06F 8/65* (2013.01); *G16Y 30/00* (2020.01); *G16Y 40/35* (2020.01); *H04L 67/12* (2013.01)

(58) Field of Classification Search
CPC .......... G06F 8/65; G16Y 30/00; G16Y 40/10; G16Y 40/35; H04L 67/06; H04L 67/12; H04L 67/325; H04L 67/34
See application file for complete search history.

(56) References Cited

U.S. PATENT DOCUMENTS

2012/0324578 A1    12/2012   Seinfeld et al.
2018/0157557 A1*   6/2018    Puustinen ................ G06F 8/65
(Continued)

OTHER PUBLICATIONS

International Search Report and Written Opinion cited in corresponding PCT application No. PCT/EP2019/073254 Oct. 22, 2019; 13 pp.

*Primary Examiner* — Normin Abedin
(74) *Attorney, Agent, or Firm* — Lempia Summerfield Katz LLC

(57) ABSTRACT

A method and system for managing an operation associated with an object in an Internet of things (IoT) enabled device in an IoT environment are provided. The method includes receiving the object intended for the target IoT device from a remote system. The method also includes determining a criticality index associated with the object based on a set of pre-determined parameters associated with the object. The method includes initiating operation associated with the object by the target IoT device based on the determined criticality index.

21 Claims, 6 Drawing Sheets

(51) Int. Cl.
*G16Y 30/00* (2020.01)
*G16Y 40/35* (2020.01)
*G06F 8/65* (2018.01)
*H04L 67/12* (2022.01)

(56) References Cited

U.S. PATENT DOCUMENTS

| | | | |
|---|---|---|---|
| 2018/0189048 A1* | 7/2018 | Bala | G06F 8/65 |
| 2018/0262573 A1* | 9/2018 | Przybylski | G05B 15/02 |
| 2019/0349426 A1* | 11/2019 | Smith | H04L 9/3239 |

* cited by examiner

METHOD AND SYSTEM FOR MANAGING OPERATION ASSOCIATED WITH AN OBJECT ON IOT ENABLED DEVICES

PRIORITY

This application is the National Stage of International Application No. PCT/EP2019/073254, filed Aug. 30, 2019, which claims the benefit of European Patent Application No. EP 18191989.5, filed Aug. 31, 2018. The entire contents of these documents are hereby incorporated herein by reference.

FIELD OF TECHNOLOGY

The present embodiments generally relate to the field of Internet-of-Things (IoT), and more particularly to a method and system for managing operation of an object on an IoT enabled device in an IoT environment.

BACKGROUND

An IoT environment may include number of IoT enabled devices. These devices are connected to an IoT cloud platform and sensors and actuators via the Internet. The IoT environment may further include a control center that controls operation of objects in the devices and monitors the activities of the devices in the network. The IoT enabled devices may function based on the instructions executed within the devices. These instructions may be received from the control center. In order to function smoothly, the devices in the IoT network may require frequent upgradation of firmware and other associated software. The software updates may be, for example, security fixes that may be necessary to avoid breaches. Since the number of devices in an IoT network may be huge, manual update of these devices may not be possible. Therefore, such updates may be communicated to the devices as a software package Over the Air (OTA). However, complete installation of an update in an IoT enabled device may require the device to reboot. Therefore, the IoT devices may be unavailable for a short duration during the upgradation process. During this period, occurrence of some critical events that are to be monitored by the IoT enabled devices may result in untoward complications.

SUMMARY AND DESCRIPTION

In the light of the above, there exists a need to provide a method and a system for managing operation associated with an object on Internet of things (IoT) enabled devices in an IoT environment, that minimize the impact of device unavailability in an IoT network. The object of the present embodiments is to provide a method and a system for managing an operation associated with an object on IoT enabled devices, that are efficient and convenient.

In the following, the solution according to the present embodiments is described with respect to the claimed system as well as with respect to the claimed method. Features, advantages, or alternative embodiments herein may be assigned to the other claimed objects and vice versa. In other words, claims for the system may be improved with features described or claimed in the context of the method. In this case, the functional features of the method are embodied by objective units of the system.

The scope of the present invention is defined solely by the appended claims and is not affected to any degree by the statements within this summary.

The present embodiments achieve the object by a method of managing operation of an object on an IoT enabled device in an IoT environment. The method includes receiving an object intended for a target IoT device from a remote system. The remote system may be, for example, a control center or the IoT cloud platform. For example, the object may be a firmware upgrade for the target IoT device. Alternatively, the object may be a software update for security fixes that may be necessary to avoid breaches. Operation associated with the object may include, for example, installation if the object intended for the target IoT device is a software update. Alternatively, operation may be deployment of software in the target IoT device. The IoT enabled device may be a device having IoT capability or a capability of communicating with an IoT cloud platform and/or IoT devices such as an edge device sitting at an edge of a premise or network.

The method further includes determining a criticality index associated with the object based on a set of pre-determined parameters associated with the object. The criticality index associated with the object may determine how quickly the operation associated with the object may have to be performed in the target IoT device. The criticality index associated with the object may determine the importance of the object for the target IoT device. The criticality index may be determined, for example, based on a message associated with the object. Alternatively, the object may be associated with a criticality classification that enables determination of the criticality index of the object. Therefore, for example, on a scale of 1 to 5, the classification parameter 1 may be associated with highest criticality, and the classification parameter 5 may be associated with lowest criticality.

In an embodiment, determining the criticality index associated with the object includes identifying a criticality factor associated with each of the pre-determined parameters in the set of pre-determined parameters. The parameters may be, for example, a type of the target IoT device in which the operation associated with the object is to be performed, and/or the importance of the object. A criticality factor may be associated with each of the pre-determined parameters, which enables identification of the criticality factor of the parameter. The criticality factor may be depicted, for example, by a numerical value. The criticality index is computed based on the identified criticality factors. For example, the criticality index may be a sum of the criticality factors. Alternatively, the criticality index may be an average value of the criticality factors.

In an embodiment, initiating the operation associated with the object by the target IoT device includes determining whether the criticality index associated with the object is greater than or equal to a pre-defined threshold. A threshold may be defined based on which criticality index of the object may be determined. In one embodiment, the operation associated with the object is performed by the target IoT device based on the criticality index being above or below a threshold. Therefore, the device unavailability is managed efficiently. If the criticality index is greater than or equal to the pre-determined threshold, the operation associated with the object is initiated by the target IoT device. If the criticality index is below the pre-determined threshold, the operation associated with the object is deferred by the target IoT device. Such deference may be, for example, for a defined time period. Alternatively, the time period for which the operation is deferred may be determined dynamically. Therefore, the time period during which one or more IoT enabled devices are unavailable is reduced. Yet another advantage is that the impact of the unavailability of the IoT enabled device is minimized.

In an embodiment, a suitable time period during which the operation associated with the object may be successfully performed by the target IoT device is determined. Such operation is performed based on the criticality index. The suitable time period may also be termed as an execution slot or a time window within which the operation associated with the object is to be initiated by the target IoT device. In an embodiment, based on the criticality index, the operation associated with the object may have to be performed by the target IoT device within a short period of time. In one embodiment, the operation associated with critical objects may be performed without further delay.

In an embodiment, in determining the suitable time period for initiating the operation associated with the object, the method includes determining whether the operation associated with the object is to be initiated by the target IoT device. Such determination may be based on the criticality index associated with the object. If the operation associated with the object is to be initiated, a next available time period is determined for initiation of the operation. The next available time period may be determined, for example, based on one or more activities and artifacts queued for operation in the target IoT device. In one embodiment, the initiation of operation associated with the object by the target IoT device has minimal impact on the availability and functioning of the target IoT device.

In an embodiment, in determining the suitable time period for performing the operation associated with the object by the target IoT device, the method includes determining whether the operation associated with the object is to be initiated by the target IoT device immediately. If so, all operations on the target IoT device are suspended to initiating the operation associated with the object. Such operation may be performed if the operation associated with the object has highest criticality for the target IoT device.

In an embodiment, the operation associated with the object is initiated by the target IoT device based on the determined suitable time period. In one embodiment, the performance of the operation of the object is managed efficiently in the IoT enabled devices.

In an embodiment, the method further includes determining a suitable time period during which the operation associated with the object may be successfully performed by the target IoT device. Based on the criticality index associated with the object, the operation associated with the object may be performed immediately or may be deferred. In determining the suitable time period, the method includes determining whether the operation associated with the object is deferred. In an embodiment, if the criticality index associated with the object is below the pre-determined threshold, the operation associated with the object may be deferred by the target IoT device. The method further includes determining an event history of the target IoT device. The event history of the target IoT device may include time logs of occurrence of one or more events in the target IoT device. The event history may also include the type of the event and records of time taken for the execution of an event in the target IoT device. The event history may be recorded, for example, in a database. The method further includes identifying a probability of occurrence of an incoming event in the target IoT device. The probability of occurrence of an incoming event may be determined, for example, based on the event history of the peer IoT devices and also the event history of the target IoT device. The peer IoT devices may be queried about the occurrence of an event in the past to determine the probability of occurrence of an incoming event in the target IoT device. The method further includes determining the suitable time period for the initiation of the operation associated with the object based on the event history and the probability of occurrence of the incoming event. A time period when the target IoT device is most idle is determined based on the event history and the probability of occurrence of event in the target IoT device. The operation associated with the object may be performed by the target IoT device in this idle time period.

In an embodiment, the operation associated with the object is initiated by the target IoT device based on the determined suitable time period. In one embodiment, the operation associated with the object is managed efficiently in the IoT enabled devices.

In an embodiment, the object received by the target IoT device is an artefact to be executed in the target IoT device. For example, the object may be a firmware upgrade to be executed in the target IoT device. Alternatively, the object may be a security update to be executed in the target IoT device.

In an embodiment, the event history of the target IoT device is updated based on the occurrence of the incoming event in peer IoT devices, where the target IoT device is offline during the performance of the operation associated with the object.

The present embodiments further achieve the object by an IoT device for managing execution of an object in one or more IoT enabled devices. The IoT device includes: a processing unit; a database coupled to the processing unit; and a memory coupled to the processing unit, where the memory includes an object management module. The object management module is configured to receive an object intended for a target IoT device from a remote system. The remote system may be, for example, the control center or the IoT cloud platform. For example, the object may be a firmware upgrade for the target IoT device. Alternatively, the object may be a software update for security fixes that may be necessary to avoid breaches. Operation associated with the object may include, for example, installation if the object intended for the target IoT device is a software update. Alternatively, operation may be deployment of software in the target IoT device.

The object management module is further configured to determine a criticality index associated with the object based on a set of pre-determined parameters associated with the object. The criticality index associated with the object may determine how quickly the operation associated with the object may have to be performed in the target IoT device. The criticality index associated with the object may determine the importance of the object for the target IoT device. The criticality index may be determined, for example, based on a message associated with the object. Alternatively, the object may be associated with a criticality classification that enables determination of the criticality index of the object. Therefore, for example, on a scale of 1 to 5, the classification parameter 1 may be associated with highest criticality, and the classification parameter 5 may be associated with lowest criticality.

In an embodiment, in determining the criticality index associated with the object, the object management module is configured to identify a criticality factor associated with each of the pre-determined parameters in the set of pre-determined parameters. The parameters may be, for example, a type of the target IoT device in which the operation associated with the object is to be performed, and/or the importance of the object. A criticality factor may be associated with each of the pre-determined parameters, which enables identification of the criticality factor of the parameter. The criticality factor may be depicted, for example, by a numerical value. The criticality index is computed based on the identified criticality factors. For example, the criticality index may be a sum of the criticality factors. Alternatively, the criticality index may be an average value of the criticality factors.

In an embodiment, in initiating the operation associated with the object by the target IoT device, the object management module is configured to determine whether the criticality index associated with the object is greater than or equal to a pre-defined threshold. A threshold may be defined based on which the criticality index of the object may be determined. In one embodiment, the operation associated with the object is performed by the target IoT device based on the criticality index being above or below a threshold. Therefore, the device unavailability is managed efficiently. If the criticality index is greater than or equal to the pre-determined threshold, the operation associated with the object is initiated by the target IoT device. If the criticality index is below the pre-determined threshold, the operation associated with the object is deferred by the target IoT device. Such deference may be, for example, for a defined time period. Alternatively, the time period for which the operation is deferred may be determined dynamically. Therefore, the time period during which one or more IoT enabled devices are unavailable is reduced. Yet another advantage is that the impact of the unavailability of the IoT enabled device is minimized.

In an embodiment, a suitable time period during which the operation associated with the object may be successfully performed by the target IoT device is determined by the object management module. Such operation is performed based on the criticality index. The suitable time period may also be termed as an execution slot or a time window within which the operation associated with the object is to be initiated by the target IoT device. In an embodiment, based on the criticality index, the operation associated with the object may have to be performed by the target IoT device within a short period of time. In one embodiment, the operation associated with critical objects may be performed without further delay.

In an embodiment, in determining the suitable time period for initiating the operation associated with the object, the object management module is configured to determine whether the operation associated with the object is to be initiated by the target IoT device. Such determination may be based on the criticality index associated with the object. If the operation associated with the object is to be initiated, a next available time period is determined for initiation of the operation. The next available time period may be determined, for example, based on one or more activities and artefacts queued for operation in the target IoT device. In one embodiment, the initiation of operation associated with the object by the target IoT device has minimal impact on the availability and functioning of the target IoT device.

In an embodiment, in determining the suitable time period for performing the operation associated with the object by the target IoT device, the object management module is configured to determine whether the operation associated with the object is to be initiated by the target IoT device immediately. If so, all operations on the target IoT device are suspended so as to initiate the operation associated with the object. Such operation may be performed if the object has highest criticality for the target IoT device.

In an embodiment, the object management module is configured to initiate the operation associated with the object based on the determined suitable time period. In one embodiment, the performance of the operation associated with the object in the IoT enabled devices is managed efficiently.

In an embodiment, the object management module is configured to determine a suitable time period during which the operation associated with the object may be successfully performed by the target IoT device. Based on the criticality index associated with the object, the operation associated with the object may be performed immediately or may be deferred. In determining the suitable time period, the object management module is configured to determine whether the operation associated with the object is deferred. In an embodiment, if the criticality index associated with the object is below the pre-determined threshold, the operation associated with the object may be deferred by the target IoT device. The object management module is further configured to determine an event history of the target IoT device. The event history of the target IoT device may include time logs of occurrence of one or more events in the target IoT device. The event history may also include the type of the event and records of time taken for the execution of an event in the target IoT device. The event history may be recorded, for example, in a database. The object management module is configured to identify a probability of occurrence of an incoming event in the target IoT device. The probability of occurrence of an incoming event may be determined, for example, based on the event history of the peer IoT devices and also the event history of the target IoT device. The peer IoT devices may be queried about the occurrence of an event in the past to determine the probability of occurrence of an incoming event in the target IoT device. The object management module is configured to determine the suitable time period for the initiation of the operation associated with the object based on the event history and the probability of occurrence of the incoming event. A time period when the target IoT device is most idle is determined based on the event history and the probability of occurrence of event in the target IoT device. The operation associated with the object may be performed by the target IoT device in this idle time period.

In an embodiment, the operation associated with the object is initiated by the target IoT device based on the determined suitable time period. In one embodiment, the operation associated with the object is managed efficiently in the IoT enabled devices.

In an embodiment, the object received by the target IoT device is an artefact to be executed in the target IoT device. For example, the object may be a firmware upgrade to be executed in the target IoT device. Alternatively, the object may be a security update to be executed in the target IoT device.

In an embodiment, the event history of the target IoT device is updated based on the occurrence of the incoming event in peer IoT devices, where the target IoT device is offline during the performance of the operation associated with the object.

The present embodiments relate, in one aspect, to a system including an IoT cloud platform and one or more devices, communicatively coupled to the IoT cloud platform. The one or more devices may be configured to manage an operation associated with an object in an IoT enabled device in an IoT environment.

The present embodiments relate, in one aspect, to a computer program product including a computer program. The computer program is loadable into a storage unit of a system. The computer program includes program code sections to make the system execute the method according to an aspect of the present embodiments when the computer program is executed in the system.

The present embodiments relate, in one aspect, to a computer-readable medium, on which program code sections of a computer program are saved. The program code sections are loadable into and/or executable in a system to make the system execute the method according to an aspect of the present embodiments when the program code sections are executed in the system.

The realization of the present embodiments by a computer program product and/or a computer-readable medium has the advantage that already existing allocation systems may be easily adopted by software updates in order to work as proposed by the present embodiments.

The computer program product may be, for example, a computer program or include another element apart from the computer program. This other element may be hardware (e.g., a memory device), on which the computer program is stored, a hardware key for using the computer program, and the like, and/or software (e.g., a documentation or a software key for using the computer program).

BRIEF DESCRIPTION OF THE DRAWINGS

The present invention is further described hereinafter with reference to illustrated embodiments shown in the accompanying drawings, in which.

DETAILED DESCRIPTION

Figure 1:
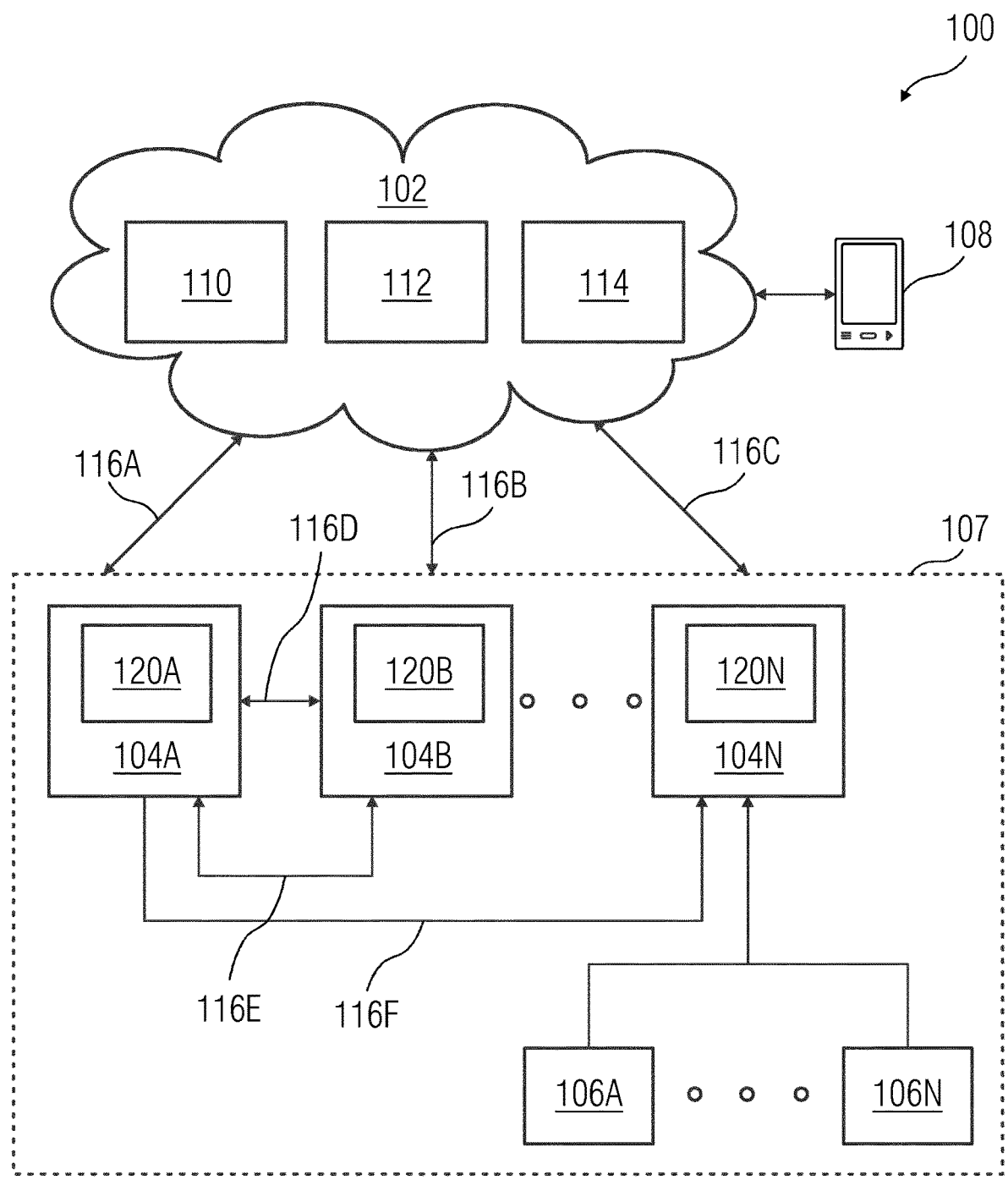
FIG. 1 is a schematic representation of an Internet-of-Things (IoT) environment, according to a first embodiment.

Hereinafter, embodiments for carrying out the present invention are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 is a schematic representation of an Internet-of-Things (IoT) environment 100, according to a first embodiment. The IoT environment 100 includes an IoT-cloud platform 102, one or more plants 107 connected to the IoT-cloud platform 102, and a user device 108. The one or more plants 107 may be an industrial setup such as a manufacturing facility, a power plant, etc. The plants 107 may be geographically distributed. Each of the plants 107 may include IoT-based devices or IoT enabled devices 104A-N. The IoT-based devices 104A-N may be edge devices, IoT gateways, and/or different types of assets (e.g., equipment, machines, devices, sensors, actuators, etc.) located in the plant 107. Each of the IoT-based devices 104A-N is capable of communicating with the IoT-cloud platform 102 using respective communication interfaces 120A-N via communication links 116A-C via the Internet. Also, the IoT-based devices 104A-N are capable of communicating with each other using respective communication interfaces 120A-N via communication links 116D to 116F. The communication links 116D to 116F may be wired or wireless links.

Also, in the plant 107, the one or more IoT-based devices 104N may be connected to assets 106A-N in the plant 107 that cannot directly communicate with the IoT-cloud platform 102. As shown in FIG. 1, the IoT-based device 104N is connected to assets 106A-N via wired or wireless network. For example, the IoT-based device 104N may be an IoT gateway, and the assets 106A-N may be robots, sensors, actuators, machines, robots, or other field devices that communicate to the IoT-cloud platform 102 via the IoT gateway 104N.

Each of the IoT-based devices 104A-N is configured for communicating with the IoT-cloud platform 102 via the communication interfaces 120A-N. The IoT-based devices 104A-N may have an operating system and at least one software program for performing desired operations in the plant 107. Also, the IoT-based devices 104A-N may run software applications for collecting and pre-processing plant data (e.g., process data), and transmitting the pre-processed data to the IoT-cloud platform 102. The plant data is sensitive data and is to be handled in a secured manner. For this, the IoT environment 100 is to be secured and free from security attacks (e.g., hacker attacks, malware attacks, etc.). It is important that the IoT-based devices 104A-N comply with pre-defined security requirements (e.g., security policies, security rules, etc.) to keep the IoT environment 100 free from cyber-attacks and other security risks. For example, the IoT-based devices 104A-N may have up-to-date security algorithms and certificates (e.g., anti-virus software, anti-malware software, security certificates, software patches, etc.).

The IoT-cloud platform 102 may be a cloud infrastructure capable of providing cloud-based services such as data storage services, data analytics services, data visualization services, etc. based on the plant data. The IoT-cloud platform 102 may be part of public cloud or a private cloud. The IoT-cloud platform 102 may enable data scientists/software vendors to provide software applications/firmware as a service, thereby eliminating a need for software maintenance, upgrading, and backup by the users. The software application may be full application or software patch.

Figure 2:
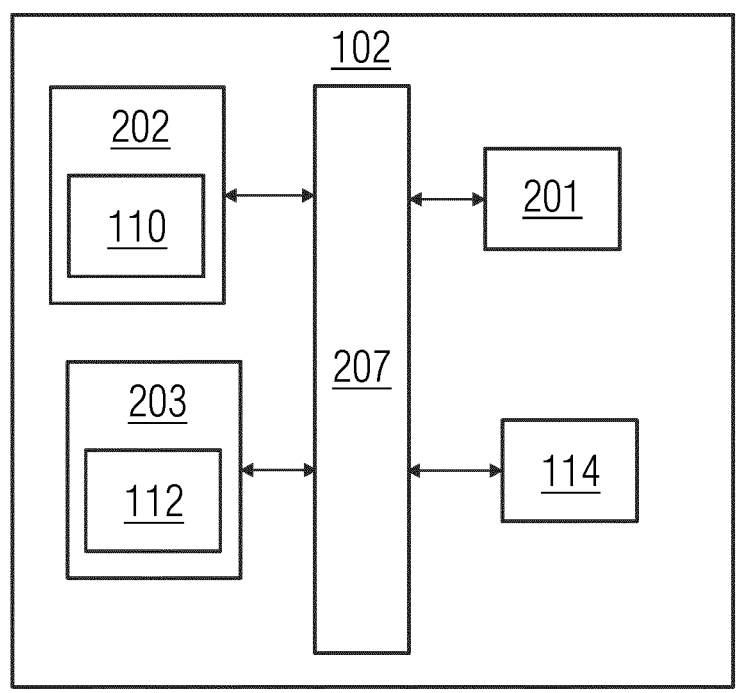
FIG. 2 is a block diagram of an IoT-cloud platform, as shown in FIG. 1, according to the first embodiment.

The IoT-cloud platform 102 is further illustrated in greater detail in FIG. 2. Referring to FIG. 2, the IoT cloud platform includes a processing unit 201, a memory 202, a storage unit 203, a network interface 114, and a standard interface or bus 207. The IoT cloud platform 102 may be an exemplary embodiment of a system. The system 102 may be a computer, a workstation, a virtual machine running on host hardware, a microcontroller, or an integrated circuit (e.g., personal). As an alternative, the system 102 may be a real or a virtual group of computers (the technical term for a real group of computers is "cluster", the technical term for a virtual group of computers is "cloud").

The processing unit 201, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 201 may also include embedded controllers, such as generic or programmable logic devices or arrays, application specific integrated circuits, single-chip computers, and the like. In general, a processing unit 201 may include hardware elements and software elements. The processing unit 201 may be configured for multithreading (e.g., the processing unit 201 may host different calculation processes at the same time, executing either in parallel or switching between active and passive calculation processes).

The memory 202 may be volatile memory and non-volatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes an operation management module 110 stored in the form of machine-readable instructions on any of the above-mentioned storage media and may be in communication to and executed by processing unit 201. When executed by the processing unit 201, the operation management module 110 causes the processing unit 201 to manage operation associated with an object in an IoT enabled devices in an IoT environment. The operation management module may further cause the processing unit to determine a criticality index of the object and to initiate the operation associated with the object by a target IoT device based on the criticality index. Method acts executed by the processing unit 201 to achieve the abovementioned functionality are elaborated upon in detail in FIGS. 3, 4, 5, 6, 7 and 8.

The storage unit 203 may be a non-transitory storage medium that stores an operation management database 112. The operation management database 112 may store an event history of the one or more IoT enabled devices. Additionally, the operation management database 112 may also store the object before the initiation of the operation associated with the object in the target IoT device. The bus 207 acts as interconnect between the processing unit 201, the memory 202, the storage unit 203, and the network interface 114.

Those of ordinary skill in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The present invention is not limited to a particular computer system platform, processing unit, operating system, or network. One or more aspects of the present invention may be distributed among one or more computer systems (e.g., servers configured to provide one or more services to one or more client computers, or to perform a complete task in a distributed system). For example, one or more aspects of the present invention may be performed on a client-server system that includes components distributed among one or more server systems that perform multiple functions according to various embodiments. These components include, for example, executable, intermediate, or interpreted code that communicates over a network using a communication protocol. The present invention is not limited to be executable on any particular system or group of systems, and is not limited to any particular distributed architecture, network, or communication protocol.

Disclosed embodiments provide systems and methods for managing operation associated with an object in one or more IoT enabled devices in an IoT environment. For example, the systems and methods may initiate operation associated with an object in a target IoT device based on a criticality index associated with the object.

Figure 3:
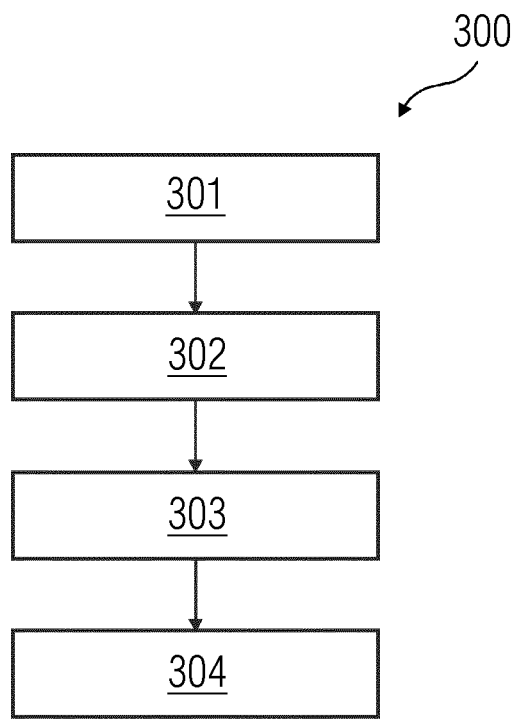
FIG. 3 illustrates a flowchart of a method of managing an operation associated with an object in one or more IoT enabled devices, according to an embodiment.

FIG. 3 illustrates a flowchart of a method 300 of an exemplary method of managing operation associated with an object in one or more IoT enabled devices 104A-104N in an IoT environment 100, according to an embodiment. At act 301, an object intended for a target IoT device 104A is received. In an embodiment, the object may be an artefact to be executed in a target IoT device 104A. For example, the object may be a firmware upgrade to be executed in the target IoT device 104A for a security fix. Alternatively, the object may be an update that corrects an error in the operation of the target IoT device 104A. Such object may be received by the target IoT device 104A from the IoT cloud platform 102. The IoT cloud platform 102 may control and monitor communication between one or more IoT enabled devices 104A-N in an IoT network. At act 302, the criticality index of the object is determined. In an embodiment, one or more pre-determined parameters may be associated with the object. The pre-determined parameters may enable determining the criticality index of the object. The pre-determined parameters may define the importance of the object for the target IoT device 104A. In an embodiment, the criticality index may be determined, for example, based on a message associated with the object. Alternatively, a classification may be associated with the object based on which the criticality index of the object may be determined. For example, the classification of the object may be defined on a fixed scale of 1 to 5. The classification parameter 1 may be associated with highest criticality, and the classification parameter 5 may be associated with lowest criticality. Such message or classification is determined based on the set of pre-determined parameters associated with the object.

In an embodiment, the pre-determined parameters may include, for example, the device on which the object is to be installed. For example, if target IoT device 104A on which the operation associated with the object is to be managed is an edge device sitting at an edge of a premise or network, the operation associated with such object may have to be initiated on such target IoT device 104A with higher priority. The pre-determined parameters may also include the importance of the object to be executed in the target IoT device 104A. The method acts of determining the criticality index associated with the object is elaborated in detail under FIG. 4.

At act 303 of the method 300, a suitable time period during which the operation associated with the object may be successfully performed by the target IoT device 104A is determined. In an embodiment, the suitable time period for the performance of the operation associated with the object is determined based on the criticality index associated with the object, event history of the target IoT device 104A, and/or probability of occurrence of an event in the target IoT device 104A. The method acts of determining the suitable time period for initiation of the operation associated with the object is elaborated in FIGS. 6, 7 and 8. At act 304, the operation associated with the object is initiated based on the determined suitable time period.

Figure 4:
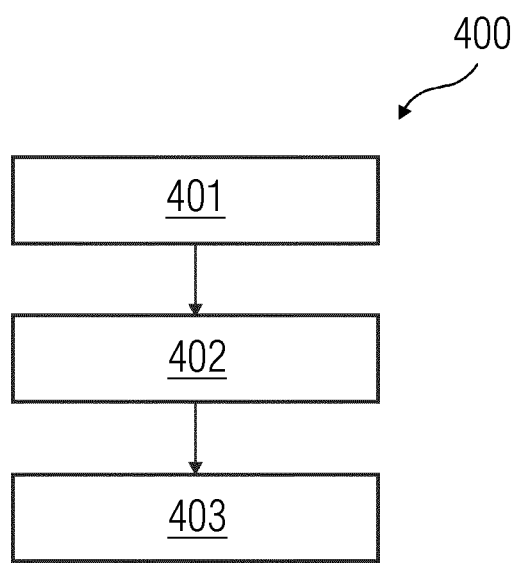
FIG. 4 illustrates a flowchart of a method of managing an operation associated with an object in one or more IoT enabled devices, according to an embodiment.

FIG. 4 illustrates a flowchart of an exemplary method 400 of determining the criticality index associated with the object, according to an embodiment. At act 401, a set of pre-determined parameters associated with the object are determined. The parameters may be, for example, a type of the target IoT device 104A in which the operation associated with the object is to be performed, and/or the importance of the object. At act 402, criticality associated with each of the pre-determined parameter is identified. A criticality factor may be associated with each of the pre-determined parameters, which enables identification of the criticality of the parameter. Based on the criticality factors, the criticality index associated with the object is determined. In an embodiment, if the importance of the object is high, the criticality factor associated with this pre-determined parameter is high. Similarly, a criticality factor of each of the pre-determined parameters is identified. The criticality factor may be depicted, for example, by a numerical value. In an embodiment, the higher the numerical value, the higher is the criticality factor of the pre-determined parameter. At act 403, the criticality index of the object is computed based on the criticality factor of the pre-determined parameters. For example, the criticality index may be a sum of the criticality factors. Alternatively, the criticality index may be an average value of the criticality factors.

Figure 5:
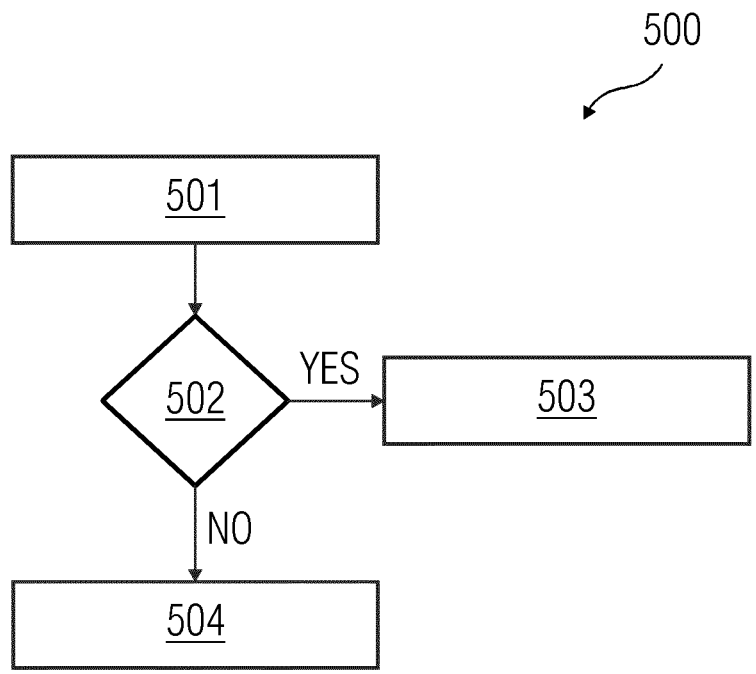
FIG. 5 illustrates a flowchart of a method of initiating an operation associated with the object by the target IoT device, according to an embodiment.

FIG. 5 illustrates a flowchart of an exemplary method 500 of initiating an operation associated with the object by the target IoT device 104A, according to an embodiment. At act 501, the criticality index of the object is determined based on the one or more pre-determined parameters. At act 502, the determination of the criticality index being above a defined threshold level is made. In an embodiment, the threshold level determines the criticality of the object for the target IoT device 104A. Therefore, if the criticality index is above the threshold, the criticality of the object is high. However, if the criticality index is below the threshold, the criticality of the object is low. If the criticality index is above the threshold level, at act 503, the operation associated with the object is initiated by the target IoT device. If the criticality index is below the threshold level, at act 504, the operation associated with the object is deferred by the target IoT device.

Figure 6:
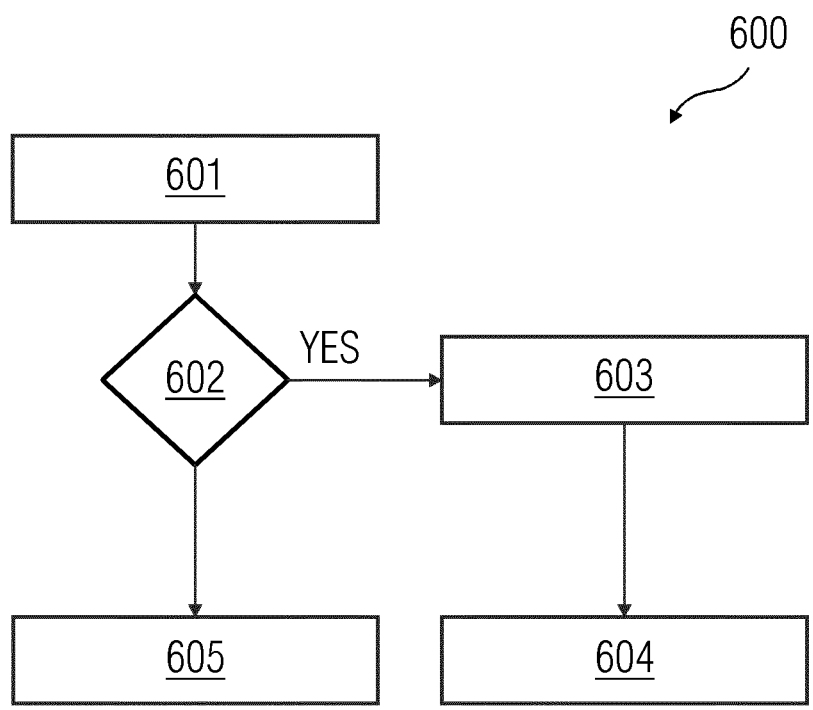
FIG. 6 illustrates a flowchart of a method of determining a suitable time period during which the operation associated with the object may be successfully performed, according to an embodiment.

FIG. 6 illustrates a flowchart of an exemplary method 600 of determining a suitable time period during which the operation associated with the object may be successfully performed, according to an embodiment. At act 601, the criticality index associated with the object is determined. At act 602, the determination of the criticality index being above a defined threshold level is made. If the criticality level is above the defined threshold, at act 603, a next available time slot in the target IoT device 104A is computed. The next available time slot may be computed, for example, based on an existing queue of tasks in the target IoT device 104A. At act 604, the operation associated with the object is initiated by the target IoT device 104A based on the computed next available time slot. If the criticality index associated with the object is below the threshold, at act 605, the operation associated with the object is deferred.

Figure 7:
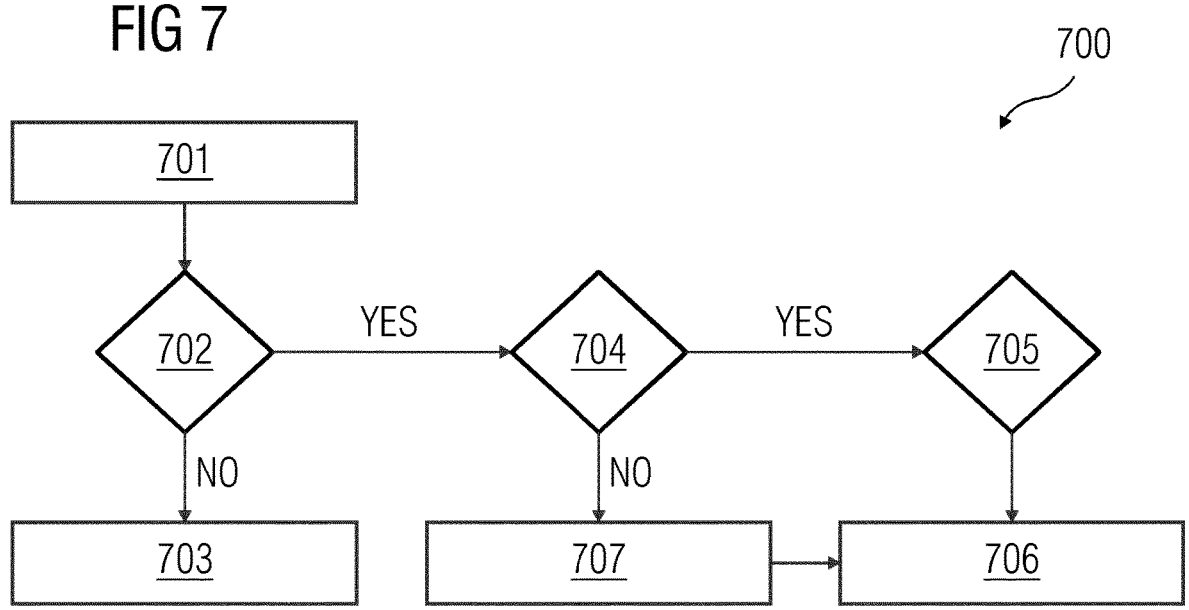
FIG. 7 illustrates a flowchart of a method of determining a suitable time period during which the operation associated with the object may be successfully performed, according to another embodiment.

FIG. 7 illustrates a flowchart of method 700 of determining a suitable time period during which the operation associated with the object may be successfully performed, according to another embodiment. At act 701, the criticality index associated with the object is determined. At act 702, the determination of the criticality index being above a defined threshold level is made. If the criticality index is above the threshold level, whether the execution of the object is urgent is determined at act 704. If the execution of the object is urgent, at act 705, all ongoing tasks on the target IoT device 104A are suspended to accommodate the operation associated with the object by the target IoT device 104A. At act 706, the operation associated with the object is initiated by the target IoT device 104A. If the execution of the object is not urgent, at act 707, a next available time period for the operation associated with the object is determined. Based on the available time period, the operation associated with the object is initiated in the target IoT device 104A.

Figure 8:
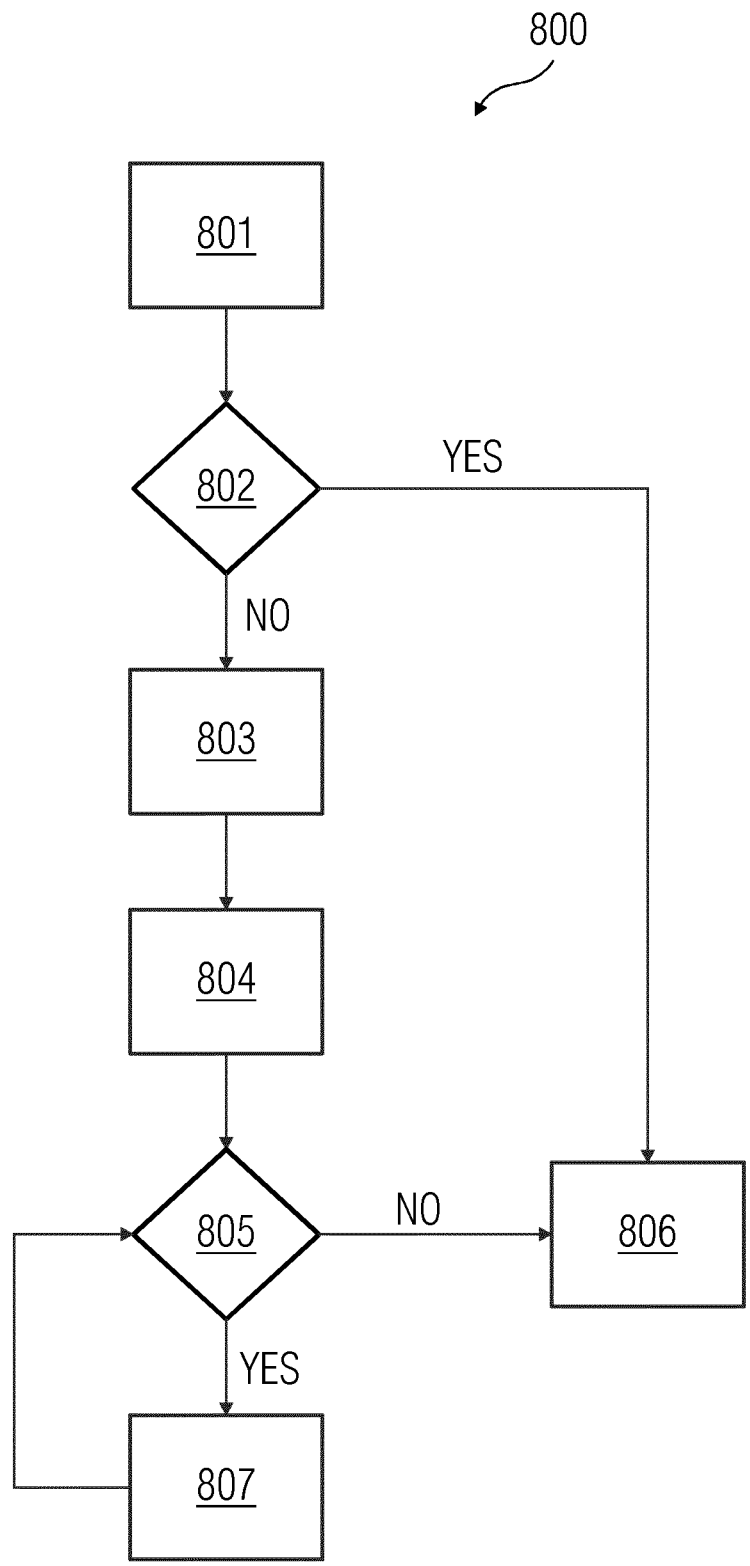
FIG. 8 illustrates a flowchart of a method of determining a suitable time period for the operation associated with the object, when the operation is deferred, according to an embodiment.

FIG. 8 illustrates a flowchart of an exemplary method 800 of determining a suitable time period for the initiation of the operation associated with the object in the target IoT device 104A, when the execution of the object is deferred. At act 801, the criticality index associated with the object is determined. At act 802, the determination of the criticality index being above a defined threshold level is made. If the criticality index associated with the object is low, at act 803, the event history of the target IoT device 104A is determined to identify a suitable time period for the initiation of the operation associated with the object. The event history may include, for example, one or more logs associated with the target IoT device 104A. The logs may include a time series history of events that may provide information related to a time period in a day during which the number of events occurred the most and at which time periods the events occurred the least. In an embodiment, an average number of events that occur in a given time period is determined.

The average number of events occurring in the given time period may change dynamically based on, for example, changes in the IoT environment, changes in the operating hours of the target IoT device 104A, etc. At act 804, the event history of one or more peer devices 104B-N in the IoT network is checked to determine a probability of occurrence of an event in the target IoT device 104A. In an embodiment, the activity details of the peer devices may be checked to determine the chance of occurrence of an incoming event in the target IoT device 104A. At act 805, the determination of whether a probability of occurrence of an event exists is made. For example, a query message may be broadcasted to the peer devices 104B-N in the IoT network to determine the probability of occurrence of an event. Alternatively, the control center or the IoT cloud platform 102 may be queried to send information about the peer devices 104B-N that are in the vicinity of the target IoT device 104A. If there is no probability, the operation associated with the object is initiated in the target IoT device, and the operation associated with the object is performed in the target IoT device 104A at act 806. In an embodiment, on performing the operation associated with the object on the target IoT device 104A, a notification may be sent to the control center or the IoT cloud platform 102 about the status of such operation.

If a probability of an occurrence of an event in the target IoT device 104A exists, at act 807, no action is taken for a pre-defined wait period. On expiry of the predefined wait period, the activity of the peer devices 104B-N is checked again for initiation of operation associated with the object in the target IoT device 104A. In an embodiment, if the suitable time period within which the operation associated with the object is to be performed has lapsed before the expiry of the pre-defined wait period, the event history of the target IoT device 104A is determined again to identify another suitable time period for such initiation. Additionally, if the occurrence of an event is identified in the peer devices 104B-N, a probability of occurrence of a similar event in the target IoT device 104A is determined. Such a probability may be determined based on a co-occurrence of events recorded in the event history of the target IoT device 104A and/or the peer devices 104B-N. In an embodiment, the pre-defined wait period may be dynamically adjusted. The optimum wait period may be learned using, for example, reinforcement learning. In yet another embodiment, the target IoT device 104A may be offline during the performance of the operation associated the object. When the target IoT device 104A is offline, the event history of the target IoT device 104A may be updated based on the event history of the peer IoT devices 104B-N.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may effect numerous modifications thereto, and changes may be made without departing from the scope and spirit of the invention in its aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of managing an operation associated with an object on a target Internet of things (IoT) enabled device in an IoT environment, the method comprising:
   receiving the object intended for the target IoT enabled device from a remote system;
   determining a criticality index associated with the object based on a set of pre-determined parameters associated with the object;
   determining a probability of occurrence of an incoming event at the target IoT enabled device when the criticality index is greater than or equal to a pre-determined threshold, wherein the probability of occurrence of the incoming event is determined based on occurrence of an event in one or more peer IoT devices and an event history of the target IoT enabled device;
   determining a suitable time period for initiating the operation associated with the object by the target IoT enabled device based on the probability of occurrence of the incoming event; and
   initiating operation associated with the object by the target IoT enabled device based on the determined criticality index.

2. The method of claim 1, wherein determining the criticality index associated with the object comprises:
   identifying a criticality factor associated with each pre-determined parameter in the set of pre-determined parameters; and
   computing the criticality index based on the identified criticality factors.

3. The method of claim 1, wherein initiating the operation associated with the object by the target IoT enabled device comprises:
   determining whether the criticality index associated with the object is equal to or greater than a pre-determined threshold;
   when the criticality index is greater than or equal to the pre-determined threshold, initiating the operation associated with the object in the target IoT enabled device; and
   when the criticality index is below the pre-determined threshold, deferring the operation associated with the object by the target IoT enabled device.

4. The method of claim 1, further comprising determining a suitable time period during which the operation associated with the object is successfully performable by the target IoT enabled device based on the criticality index.

5. The method of claim 4, wherein determining the suitable time period during which the operation associated with the object is successfully performable comprises:
   determining whether the operation associated with the object is to be initiated by the target IoT enabled device; and
   computing a next available time period for initiating operation associated with the object by the target IoT enabled device.

6. The method of claim 4, wherein determining the suitable time period during which the operation associated with the object is successfully performable comprises:

determining whether the operation associated with the object is to be initiated immediately by the target IoT enabled device; and suspending all operations on the target IoT enabled device for initiating the operation associated with the object by the target IoT enabled device.

7. The method of claim 4, further comprising initiating the operation associated with the object by the target IoT enabled device based on the determined suitable time period.

8. The method of claim 1, wherein determining the suitable time period comprises:

determining whether the operation associated with the object is deferred;

determining the event history of the target IoT enabled device; and determining the suitable time period for initiating the operation associated with the object based on the event history and the probability of occurrence of the incoming event.

9. The method of claim 8, further comprising initiating the operation associated with the object by the target IoT enabled device based on the determined suitable time period.

10. The method of claim 1, wherein the object is an artefact to be operated in the target IoT enabled device.

11. The method of claim 1, wherein the event history of the target IoT enabled device is updated based on the occurrence of the incoming event in peer IoT devices, and wherein the target IoT enabled device is offline during operation of the object.

12. An Internet of things (IoT) device for managing operation associated with an object, the IoT device comprising:

a processing unit;

a database coupled to the processing unit;

a memory coupled to the processing unit, the memory comprising an operation management module configured to:

receive the object intended for the IoT device from a remote system;

determine a criticality index associated with the object based on a set of pre-determined parameters associated with the object;

determine a probability of occurrence of an incoming event at the IoT device when the criticality index is greater than or equal to a pre-determined threshold, wherein the probability of occurrence of the incoming event is determined based on occurrence of an event in one or more peer IoT devices and the event history of the IoT device;

determine a suitable time period for initiating the operation associated with the object by the IoT device based on the probability of occurrence of the incoming event; and initiate operation associated with the object by the IoT device based on the determined criticality index.

13. The IoT device of claim 12, wherein in the determination of the criticality index associated with the object, the operation management module is configured to:

identify a criticality factor associated with each pre-determined parameter in the set of pre-determined parameters; and compute the criticality index based on the identified criticality factors.

14. The IoT device of claim 12, wherein in the initiation of the operation associated with the object by the IoT device, the operation management module is configured to:

determine whether the criticality index associated with the object is equal to or greater than a pre-determined threshold;

when the criticality index is greater than or equal to the pre-determined threshold, initiate the operation associated with the object in the IoT device; and when the criticality index is below the pre-determined threshold, defer the operation associated with the object by the IoT device.

15. The IoT device of claim 12, wherein the operation management module is further configured to determine a suitable time period during which the operation associated with the object is successfully performable by the IoT device based on the criticality index.

16. The IoT device of claim 15, wherein in the determination of the suitable time period during which the operation associated with the object is successfully performable, the operation management module is configured to:

determine whether the operation associated with the object is to be initiated by the IoT device; and compute a next available time period for initiation of operation associated with the object by the IoT device.

17. The IoT device of claim 15, wherein in the determination of the suitable time period during which the operation associated with the object is successfully performable, the operation management module is configured to:

determine whether the operation associated with the object is to be initiated immediately by the IoT device; and suspend all operations on the IoT device for initiation of the operation associated with the object by the IoT device.

18. The IoT device of claim 15, wherein the operation management module is further configured to initiate the operation associated with the object by the target IoT device based on the determined suitable time period.

19. The IoT device of claim 12, wherein in the determination of the suitable time period, the operation management module is configured to:

determine whether the operation associated with the object is deferred;

determine the event history of the target IoT device; and determine the suitable time period for initiation of the operation associated with the object based on the event history and the probability of occurrence of the incoming event.

20. A system comprising:

an IoT cloud platform; and one or more devices communicatively coupled to the IoT cloud platform, each device of the one or more devices being for managing operation associated with an object and comprising:

a processing unit;

a database coupled to the processing unit;

a memory coupled to the processing unit, the memory comprising an operation management module configured to:

receive the object intended for the respective device from a remote system;

determine a criticality index associated with the object based on a set of pre-determined parameters associated with the object;

determine a probability of occurrence of an incoming event at the respective device when the criticality index is greater than or equal to a pre-determined threshold, wherein the probability of occurrence of the incoming event is determined based on occurrence of an event in one or more peer IoT devices and the event history of the respective device;

determine a suitable time period for initiating the operation associated with the object by the respective device based on the probability of occurrence of the incoming event; and initiate operation associated with the object by the respective device based on the determined criticality index.

21. A non-transitory computer readable storage medium that stores machine readable instructions executable by a processing unit to cause the processing unit to:

receive an object intended for a target IoT device from a remote system;

determine a criticality index associated with the object based on a set of pre-determined parameters associated with the object;

determine a probability of occurrence of an incoming event at the target IoT device when the criticality index is greater than or equal to a pre-determined threshold, wherein the probability of occurrence of the incoming event is determined based on occurrence of an event in one or more peer IoT devices and an event history of the target IoT device;

determine a suitable time period for initiating operation associated with the object by the target IoT device based on the probability of occurrence of the incoming event; and initiate operation associated with the object by the target IoT device based on the determined criticality index.

\* \* \* \* \*